United States Patent [19]
Oono

[11] Patent Number: 5,702,050
[45] Date of Patent: Dec. 30, 1997

[54] METHOD OF BRAZING A HONEYCOMB

[75] Inventor: Kiyoo Oono, Aichi-ken, Japan

[73] Assignee: Mitsubishi Jukogyo Kabushiki Kaisha, Tokyo, Japan

[21] Appl. No.: 634,697

[22] Filed: Apr. 18, 1996

[30] Foreign Application Priority Data

Apr. 28, 1995 [JP] Japan ................... 7-105602

[51] Int. Cl.$^6$ ................... B23P 15/04; B23K 37/04
[52] U.S. Cl. ................... 228/212; 228/181; 228/249
[58] Field of Search ................... 228/212, 246, 228/249, 252, 181; 29/889.7

[56] References Cited

U.S. PATENT DOCUMENTS

| | | | |
|---|---|---|---|
| 4,416,739 | 11/1983 | Turner | 204/29 |
| 4,623,298 | 11/1986 | Hallinger et al. | 415/139 |
| 5,197,281 | 3/1993 | Przytulski et al. | 415/174.4 |
| 5,228,195 | 7/1993 | Brown et al. | 29/883.3 |
| 5,281,089 | 1/1994 | Brown et al. | 415/173.1 |

FOREIGN PATENT DOCUMENTS 2 404 102   4/1979   France .

OTHER PUBLICATIONS

Ruffles, P., Wide–Chord Fan Proved in Nearly Five Years of Service, The Rolls–royce Magazine, No. 41, pp. 24–28 (Jun., 1989).

*Primary Examiner*—Samuel M. Heinrich
*Attorney, Agent, or Firm*—Fish & Richardson P.C.

[57] ABSTRACT

A method of brazing a honeycomb for air sealing onto a braze surface of the front end of the stationary blade of an axial-flow compressor in accordance with the invention includes the steps of: placing a filler sheet between the honeycomb and the braze surface; constraining the honeycomb in the seal width direction so that the seal width direction of the honeycomb corresponds to the seal width direction of the braze surface while keeping the figure of the honeycomb at the same curvature with that of the braze surface; and heating the assembly to braze the honeycomb and the braze surface.

2 Claims, 3 Drawing Sheets

METHOD OF BRAZING A HONEYCOMB

FIELD OF THE INVENTION AND RELATED ART STATEMENT

The present invention relates to a method of brazing a segment-type honeycomb used for air sealing, which is attached to the front face of the stationary blade of an axial-flow compressor.

FIGS. 5 and 6 show a conventional method of brazing a segment-type honeycomb.

As in the figure, in the conventional technique, a filler sheet 6 is embedded onto a honeycomb 2, which in turn is temporarily tacked to a work 1 by spot welding 8. The thus prepared structure is furnace brazed in the furnace. The stationary blade is composed by assembling a plurality of the works 1 so as to be an annular structure of 360.

Therefore, in the past, it took time and labor to embed the filler sheet 6 onto the honeycomb 2, and further there was a necessity to rub the surface of the filler sheet 6, on the side which is embedded onto the honeycomb 2, with a cutter etc., to expose the metal surface so that spot welding 8 could be performed.

Further, if the power of the spot welding 8 was too strong, spark holes were made in the honeycomb 2. While, if the power was too weak, the honeycomb 2 came off the work 1 at the tack welded portions during the brazing operation, thus brazing failures often happened.

Moreover, since the honeycomb 2 itself was twisted or warped, it was difficult to shape the upper face (the face which is opposed to the rotor) of the honeycomb 2 after brazing, into the desired curve, therefore, the continuous surface of the honeycomb 2, which is formed when the works 1 are assembled in the annular form, might present a deformed circular shape.

OBJECT AND SUMMARY OF THE INVENTION

The present invention has been achieved in view of the prior problems described above, and it is therefore an object of the present invention to provide a method of brazing a honeycomb whereby it is possible to eliminate time and labor for embedding a filler sheet onto a honeycomb, and it is possible to eliminate both the spark holes in the honeycomb, which would occur due to the spot welding, and failures of the brazing whilst still being possible to braze the honeycomb at the curvature desired.

To achieve the above object, the method of brazing a honeycomb for air sealing onto a braze surface of the front end of the stationary blade of an axial-flow compressor in accordance with the invention, includes the steps of: placing a filler sheet between the honeycomb and the braze surface; constraining the honeycomb in the seal width direction so that the seal width direction of the honeycomb corresponds to the seal width direction of the braze surface while keeping the figure of the honeycomb at the same curvature with that of the braze surface; and heating the assembly to braze the honeycomb and the braze surface.

In the above method, a jig for brazing a honeycomb is used which includes: a constraining portion for constraining the honeycomb in the seal width direction; and supporting portions for supporting the honeycomb so that the figure of the honeycomb is kept at the same curvature with that of the braze surface, and is constructed so that the constraining portion and the supporting portions are applied with an anti-brazing agent.

In the above method of brazing a honeycomb in accordance with the invention, the honeycomb can be brazed in perfect contact with a work so that the seal width of the honeycomb will correspond to the seal width of the braze surface of a work and so that the honeycomb can be supported at the same curvature with that of the braze surface.

In accordance with the invention, where is no need to temporarily tack the honeycomb to the work by spot welding. Accordingly, either spark holes which would occur if the power of spot welding was too strong or peeling of the honeycomb which would occur if the power of spot welding was too weak, will never happen. Further, there is no necessity to embed the filler sheet onto the honeycomb. Therefore, the operation steps before brazing in furnace can markedly be reduced in number while a desired seal width as well as a desired curvature of the honeycomb can be obtained, and yet the quality of brazing can be stabilized. Accordingly, no rework is necessary, resulting in a remarkable reduction in the number of steps in the operation process.

DETAILED DESCRIPTION OF PREFERRED EMBODIMENT

Figure 1:
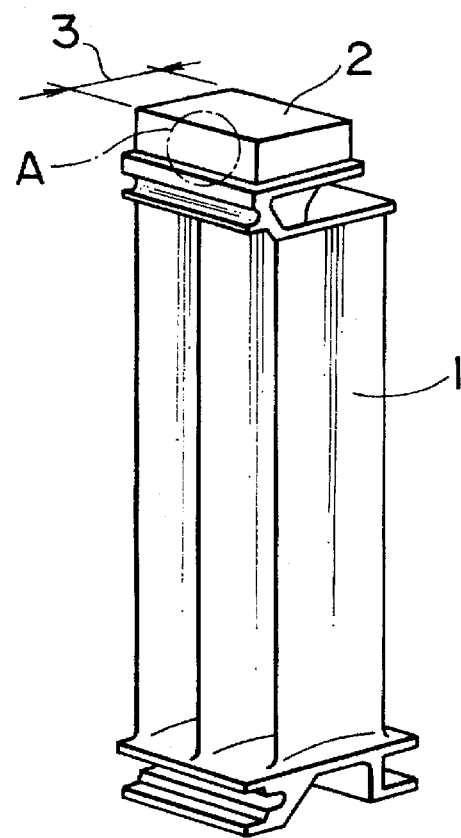
FIG. 1 is a perspective view showing a work assembly in accordance with a first embodiment of the invention.

The present invention will hereinafter be described in detail with reference to the accompanying drawings.

FIGS. 1 through 4 shows a method of brazing a segment-type honeycomb in accordance with an embodiment of the invention. The embodiment of the invention is performed in accordance with a flow chart of manufacturing shown in FIG. 3 and is a method of brazing a honeycomb 2 to a work 1.

First of all, a filler sheet 6 with an appropriate thickness is applied entirely onto a surface 5 of the work 1 to be brazed.

Next, the honeycomb 2 is fitted into a jig 7.

The jig 7 is composed of: a pressing portion 7-1 having a surface 7-3 which has approximately the same area as that of the braze surface 5 of the work 1 and the same curvature as that of the braze surface 5; and a pair of constraining/positioning portions 7-2 which are disposed in parallel to one another in a length-wise direction and spaced by a distance approximately equal to the seal width of the braze surface 5. Thus, the honeycomb 2 is fitted into the constraining/positioning portions 7-2, and consequently, the honeycomb 2 is constrained so that the seal width direction W of the honeycomb 2 corresponds to the seal width direction W of the braze surface 5 and the curvature of the honeycomb 2 also corresponds to the same curvature as that of the braze surface 5.

Shift stoppers 7-4 are attached at both ends of the positioning portion 7-2.

Inner sides of the pressing portion 7-1 and the constraining/positioning portion 7-2 are coated with ceramic so that the work 1 or the honeycomb 2 will not be brazed with the jig 7.

Figure 4:
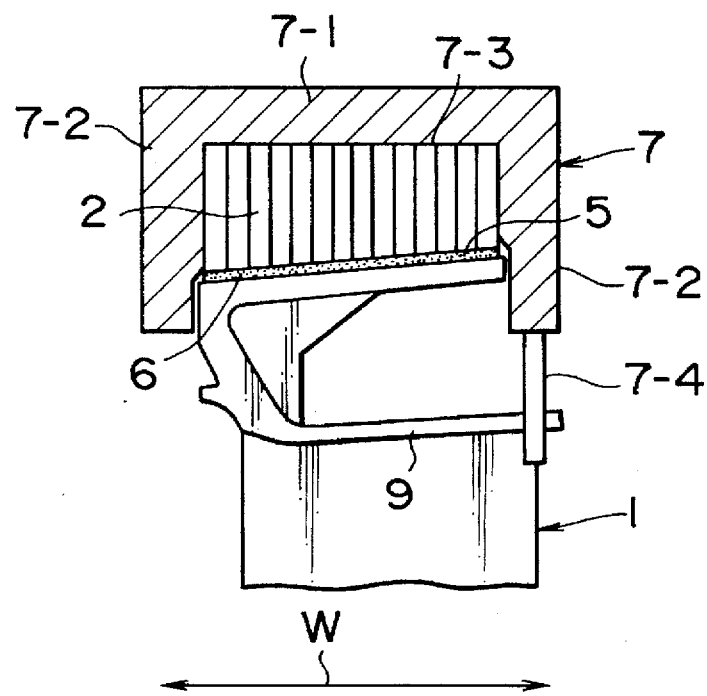
FIG. 4 is a side view showing a state when a honeycomb is brazed in accordance with the invention.
Figure 5:
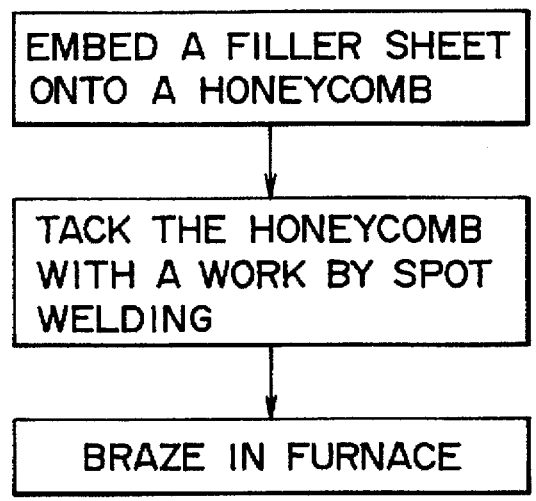
FIG. 5 is a chart showing manufacturing flow of a conventional method of brazing a honeycomb.
Figure 6:
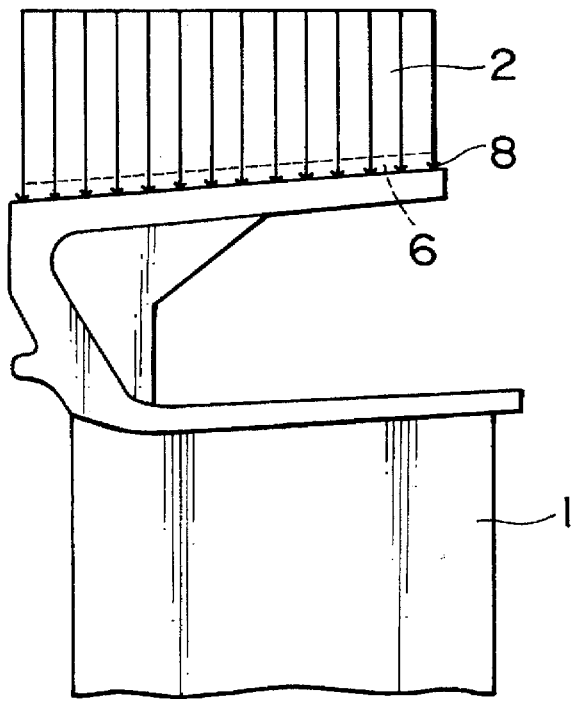
FIG. 6 is a side view showing a state when a honeycomb is brazed in accordance with a conventional method.

Subsequently, the jig 7 into which the honeycomb 2 is fitted is set over the braze surface 5 of the work 1, as shown in FIG. 4.

In this setting, the jig 7 functions as a weight so that the honeycomb 2 is pressed against the braze surface 5 of the work 1. Therefore, the honeycomb 2 and the entire braze surface 5 of the work 1 are brought into close contact with each other with their curvatures kept equal.

The constraining/positioning portions 7-2 positions the honeycomb 2 relative to the braze surface 5 so that the ends of the honeycomb 2 on the seal width side correspond to the ends of the braze surface 5 on the seal width side. The shift stoppers 7-4 are made to abut both end faces 9 of the work 1 so that the jig 7 will not be moved relative to the work 1 in the direction perpendicular to the seal width direction.

Figure 2:
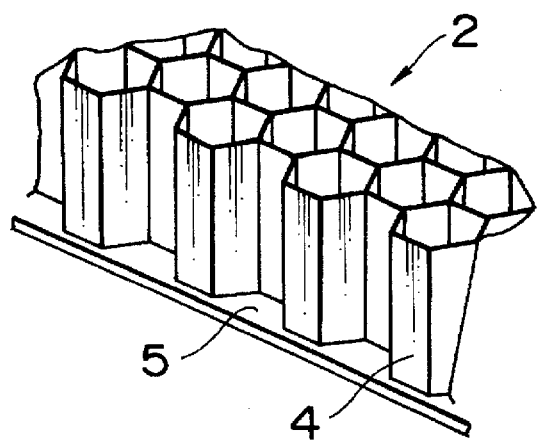
FIG. 2 is a partially enlarged view showing a honeycomb in a portion encircled by A in FIG. 1.
Figure 3:
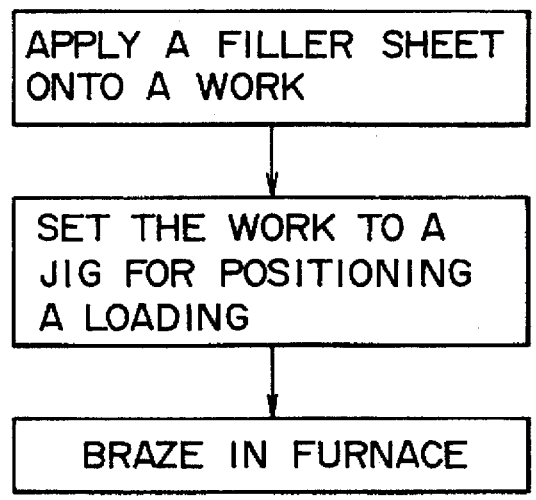
FIG. 3 is a chart showing a manufacturing flow of a method of brazing a honeycomb in accordance with the invention.

In this state, the work 1 set on the jig 7 is loaded into the furnace, where the work 1 is heated up to a brazing temperature so that the filler sheet 6 will be fused. Thus, the work 1 and the honeycomb 2 are brazed to each other at the braze surface 5, as shown in FIG. 2. At the same time, honeycomb cells 4 are brazed to each other.

The honeycomb 2 expands as it is heated, but this expansion is set off in the height direction of the honeycomb 2 as well as in the direction perpendicular to the seal width direction. As a result, the designated seal width of the honeycomb 2 and its curvature can be secured.

The internal sides of the pressing portion 7-1 and the constraining/positioning portions 7-2 can be treated with an anti-brazing agent such as ceramic coating, so that either the work 1 or the honeycomb 2 will not be brazed to the jig 7.

Since the distance between the constraining/positioning portions 7-2, near the braze surface, is set up to be slightly greater than the width of the braze surface 5 of the work 1, the honeycomb 2 is constantly pressed against the braze surface 5 of the work 1 before and after the filler sheet 6 melts. As a result, the work 1 and the honeycomb 2 are kept in close contact so that it is possible to perform good brazing.

Thereafter, when the jig 7 is removed, the adjoining of the work 1 with the honeycomb 2 brazed thereto is finished as shown in FIG. 1. In FIG. 1, a reference numeral 3 designates the seal width.

When the jig 7 is used as a weight, the jig is placed on the top during the furnace brazing operation as shown in FIG. 4, but when the work 1 is used as a weight, the work can be placed on the top.

In accordance with the above embodiment, the honeycomb 2 and the work 1 are brazed while the honeycomb 2 is constrained by the jig 7 which functions as a weight, so that the figure of the braze surface of the honeycomb 2 will not vary before and after the filler sheet 6 melts during the heat of the brazing operation. Accordingly, since the honeycomb 2 is constantly pressed against the braze surface 5 of the work 1, the honeycomb 2 is kept in close contact with the entire braze surface 5 of the work 1 so that it is possible to attain good quality of brazing.

Further, the embodiment is able to attain the following effects as compared to the prior art described above:

1) There is no need to temporarily tack the honeycomb 2 with the work 1 by spot welding. Accordingly, either spark holes which would occur if the power of spot welding was too strong or peeling of honeycomb 2 which would occur if the power of spot welding was too weak, will never happen.

2) There is no necessity to embed the filler sheet onto the honeycomb 2.

3) By the effects of the above 1) and 2), the operation steps before brazing in the furnace can markedly be reduced and yet the quality of brazing can still be stabilized. Accordingly, no rework is necessary, resulting in a remarkable reduction in the number of the operation steps.

I claim:

1. A method of brazing a honeycomb for air sealing onto a braze surface of the front end of the blade of a rotating machine, comprising the steps:

placing a filler sheet between the honeycomb and the braze surface;

constraining the honeycomb in the seal width direction so that the seal width direction of the honeycomb corresponds to the seal width direction of the braze surface while keeping the figure of the honeycomb at the same curvature with that of the braze surface;

vertically biasing the honeycomb against the braze surface by applying a uniform pressure along the seal width direction of the braze surface and the honeycomb using a jig;

heating the assembly to braze the honeycomb and the braze surface; and allowing the honeycomb to freely vertically heat expand by displacing a jig vertically while said jig continues to bias said honeycomb against the braze surface.

2. The method of claim 1 including the step of allowing the honeycomb to freely heat expand in the direction transverse to the seal width direction.

* * * * *